United States Patent
Paillet et al.

(10) Patent No.: US 9,474,212 B2
(45) Date of Patent: Oct. 25, 2016

(54) WEB WRAP DEVICE

(75) Inventors: Frédéric Paillet, Gray (FR); Pascal Gresset, Arc-les-Gray (FR); Jean Viaud, Reyssouze (FR); Michel Menetrier, Grande Rue (FR); Jean-François Fournier, Chargey les Gray (FR); Frederic Morel, Velesmes Echevanne (FR)

(73) Assignee: DEERE & COMPANY, Moline, IL (US)

( * ) Notice: Subject to any disclaimer, the term of this patent is extended or adjusted under 35 U.S.C. 154(b) by 940 days.

(21) Appl. No.: 12/432,166

(22) Filed: Apr. 29, 2009

(65) Prior Publication Data

US 2009/0272072 A1   Nov. 5, 2009

(30) Foreign Application Priority Data

Apr. 30, 2008 (EP) ..................... 08155506

(51) Int. Cl.
*A01F 15/07* (2006.01)

(52) U.S. Cl.
CPC .... *A01F 15/0715* (2013.01); *A01F 2015/0725* (2013.01)

(58) Field of Classification Search
CPC .. A01F 15/07; A01F 15/071; A01F 15/0715; A01F 2015/072; A01F 2015/0725
USPC ..................... 53/118, 211, 587, 389.1–389.4
IPC ..................................................... A01F 15/07
See application file for complete search history.

(56) References Cited

U.S. PATENT DOCUMENTS

| | | | | | |
|---|---|---|---|---|---|
| 4,407,113 | A | * | 10/1983 | Core | 56/341 |
| 4,409,784 | A | * | 10/1983 | VanGinhoven et al. | 56/341 |
| 4,676,046 | A | * | 6/1987 | Verhulst et al. | 53/118 |
| 4,697,402 | A | * | 10/1987 | Anstey et al. | 53/506 |
| 4,729,213 | A | * | 3/1988 | Raes | 56/341 |
| 4,956,968 | A | * | 9/1990 | Underhill | 56/341 |
| 4,969,315 | A | * | 11/1990 | Ardueser et al. | 53/587 |
| 5,020,299 | A | | 6/1991 | Underhill | |
| 5,216,873 | A | * | 6/1993 | Ratzlaff et al. | 53/587 |
| 5,243,806 | A | * | 9/1993 | Jennings et al. | 53/118 |
| 5,433,059 | A | * | 7/1995 | Kluver et al. | 53/399 |
| 5,479,767 | A | * | 1/1996 | McClure et al. | 56/343 |

(Continued)

FOREIGN PATENT DOCUMENTS

| EP | 0432830 B1 | 12/1994 |
|---|---|---|
| EP | 1648217 B1 | 5/2013 |

(Continued)

OTHER PUBLICATIONS

European Search Report in foreign counterpart application No. 08155506.2 dated Oct. 15, 2008 (7 pages).

*Primary Examiner* — Stephen F Gerrity

(57) ABSTRACT

A web wrap device is provided for a round baler. The device has a web carrier for pulling the web from a roll of web to a bale chamber. In a leading portion the web carrier has two elements at least one of which being moveable towards the other. The moveable element has a leading edge, which engages the web and is pulled by the tensioned web onto the other element, which increases the clamping effect. In addition a guard is provided to cover a knife during the wrapping mode, but to expose the knife to the web, when it should be cut.

14 Claims, 4 Drawing Sheets

(56) References Cited

U.S. PATENT DOCUMENTS

| | | | |
|---|---|---|---|
| 5,581,973 A * | 12/1996 | Underhill | 53/118 |
| 5,692,365 A * | 12/1997 | Meyer et al. | 53/587 |
| 5,916,116 A | 6/1999 | Vande Ryse et al. | |
| 5,979,141 A * | 11/1999 | Phillips | 53/389.2 |
| 6,021,622 A | 2/2000 | Underhill | |
| 6,116,002 A * | 9/2000 | Roth | 53/587 |
| 6,272,816 B1 * | 8/2001 | Viaud et al. | 53/587 |
| 6,886,307 B2 | 5/2005 | Viaud et al. | |
| 6,966,162 B2 * | 11/2005 | Viaud et al. | 53/64 |
| 6,971,220 B1 * | 12/2005 | Rampp | 53/441 |
| 7,237,372 B2 * | 7/2007 | Chapon et al. | 53/587 |
| 7,322,167 B2 * | 1/2008 | Chapon et al. | 53/389.2 |
| 7,356,981 B2 * | 4/2008 | McClure et al. | 53/587 |
| 7,513,088 B2 | 4/2009 | Vande Ryse | |
| 7,644,563 B2 * | 1/2010 | De Gersem | A01F 15/0715 53/118 |
| 2006/0242931 A1 | 11/2006 | Ryse | |
| 2008/0092756 A1 * | 4/2008 | Vande Ryse | 100/5 |

FOREIGN PATENT DOCUMENTS

| | | | |
|---|---|---|---|
| EP | 2266386 B1 | 9/2014 | |
| EP | 1882409 B1 | 9/2015 | |
| GB | 2440324 A | 1/2008 | |
| WO | WO 2005009112 A2 * | 2/2005 | A01F 15/0715 |
| WO | WO 2005096801 A1 * | 10/2005 | A01F 15/0715 |

* cited by examiner

WEB WRAP DEVICE

FIELD OF THE INVENTION

This invention relates to a web wrap device having a web carrier movable between a rest position and a web delivery position. The web carrier has two elements that pinch the web therebetween, when moving towards the delivery position, with at least one of the elements being moveable with respect to the other.

BACKGROUND OF THE INVENTION

EP 432 830 discloses a net wrap device on a round baler with a so-called duck bill feeding device. This duck bill feeding device uses two nearly parallel plates, which are pressed against each other by means of a spring to hold the net, when it is pulled from a roll to a bale chamber.

U.S. Pat. No. 6,886,307 teaches the use of a plate with a comb-like leading edge that grips the web and feeds it to a bale chamber.

The problem is the unreliability of these systems, when either the web is not caught properly or undue forces appear during the pulling operation.

SUMMARY OF THE INVENTION

With the invention described below the web is clamped firmly, and the higher the pulling force becomes, the higher will be the clamping force. This principle does not rely on the friction between the web and the plates on both sides of it, but on a positive connection by engagement. Such a web wrap device may be used in the front or rear of any kind of agricultural or commercial round baler, and also on wrapping apparatuses for commercial goods, like clothing, flowers, packages, etc. The web carrier and especially its elements may be made of metal, wood or plastic or a combination thereof and may be actuated manually, electrically, hydraulically, etc. The movement of the web carrier may be performed on an arc, on a track, or by means of a linkage assembly, etc. The arrangement of the moveable element refers especially to the location of its bearing with respect to the other element, to the inclination of the elements with respect to each other, etc.

Irrespective of whether the web is a net, paper, or a film, a safe gripping effect is achieved by sharp or thin elements, like teeth or spikes, or by sharp edges or the like which may enter the free spaces between the fibers of the web or which may penetrate the surface of a plastic or which may create a high surface pressure. The profile and the orientation of these elements will depend on the angle under which they hit the web and the material to be caught.

While it is preferred to use the leading edge of the element to catch and penetrate the web, it is also possible to provide for an engagement area in the vicinity near the leading edge, whereas due to a bigger surface exposure finer teeth or the like may be used as they appear on a roughened or knurled surface, like a "Klett" lock. Ultimately a high friction surface, such as a surface with very fine teeth, may be useful.

In order to increase the clamping effect, apertures like holes, slots, or simple depressions may be provided in the other element opposite to the protrusions, fingers, etc. in the moveable element. This will increase the contact surface area as well as the friction, since the web has to slip over sharp edges or the like.

When the moveable element is pivotable about a bearing that is spaced apart from the other element by at least 5 cm, two advantages are achieved: 1.) it is simple for an operator to insert the end portion of a new web, since hands may reach through the gap; and, 2.) obstacles or crop accumulation may pass through the track between the two elements without blocking the passage of the web. Of course 5 cm is a guiding dimension, which will be adjusted depending on the obstacles to pass and the need to push hands through. In the prior art device of EP 432 830 the gap between the two elements corresponds almost to the thickness of the web, which makes it difficult to feed a new web.

When the moveable element follows a sort of J- or L-shape, it will form a duck bill, which can pass through thin gaps, like between the roles of a fix chamber round baler and deliver a freely hanging end piece of web into a bale chamber, where it is caught by a rotating bale. It will depend on the circumstances, how to form the two legs of the L or J and under which angle they shall extend to each other.

Providing a deflector like a bar, a string, sheet metal or the like may help in keeping the web off the moveable element, especially when the location and the path of the moveable element allow the tensioned web to press against it, which could have an impact on its clamping force.

In order to spread the web properly across the width of the article to be wrapped, like a bale, the leading edge of the other, stationary element is moderately curved convexly and in the extension of its delivery movement. This helps the border areas of the web to be stretched outwardly and possibly even to cover the corner, e.g. of a bale. Obviously the shape would be concave, if it is desired to achieve a concentration of the web towards the center of the article to be wrapped.

While the web, once pulled by the article to be wrapped, will open the clamp between the two elements, situations may be exist, in which the moveable element does not loosen from the other element, like in the case of a deformation. In such a case it is helpful to actively force the moveable element away from the other one. This can be accomplished by using a kick-off means, like a lever, a cable, a linkage or the like, which causes such a movement, when it hits a structure, a roll of the baler, etc.

In order to form a rigid web carrier, two pivotable arms are provided, which are interconnected by either the bearing or by the deflector or by the other element or by some or all of them. This entire assembly is moved between the rest and the delivery position with the web connected at one side to a web roll and hanging off the web carrier at the other element.

Again, in order to overcome some resistance due to deformation, sticky crop juice, rust or dirt collected during a longer non-operation period, it is helpful to use a spring or to provide for such play, that the moving element can be brought into its clamping position by means of the gravity.

In a case, in which the web is not pre-perforated but needs to be cut or separated by a knife or at least a sharp separator, it is helpful to use a guard, which avoids a contact between the web and the knife before the cut. Such guard may be of plastic or metal and be formed like a stiff or flexible sheet metal, a rod, a bar or the like.

In order to allow the cutting operation to happen, the guard may be made ineffective by moving it away for example due to the tension in the web or depending on the position of the web carrier. A sensor controlled and motor operated movement is a solution as well.

In a simple way the movement of the guard may be achieved by a spring or by gravity. Assuming that the web gets in contact with the guard before it is cut, it will improve the web wrap operation, if the guard does not hinder the web movement, e.g. by having rounded edges, etc.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
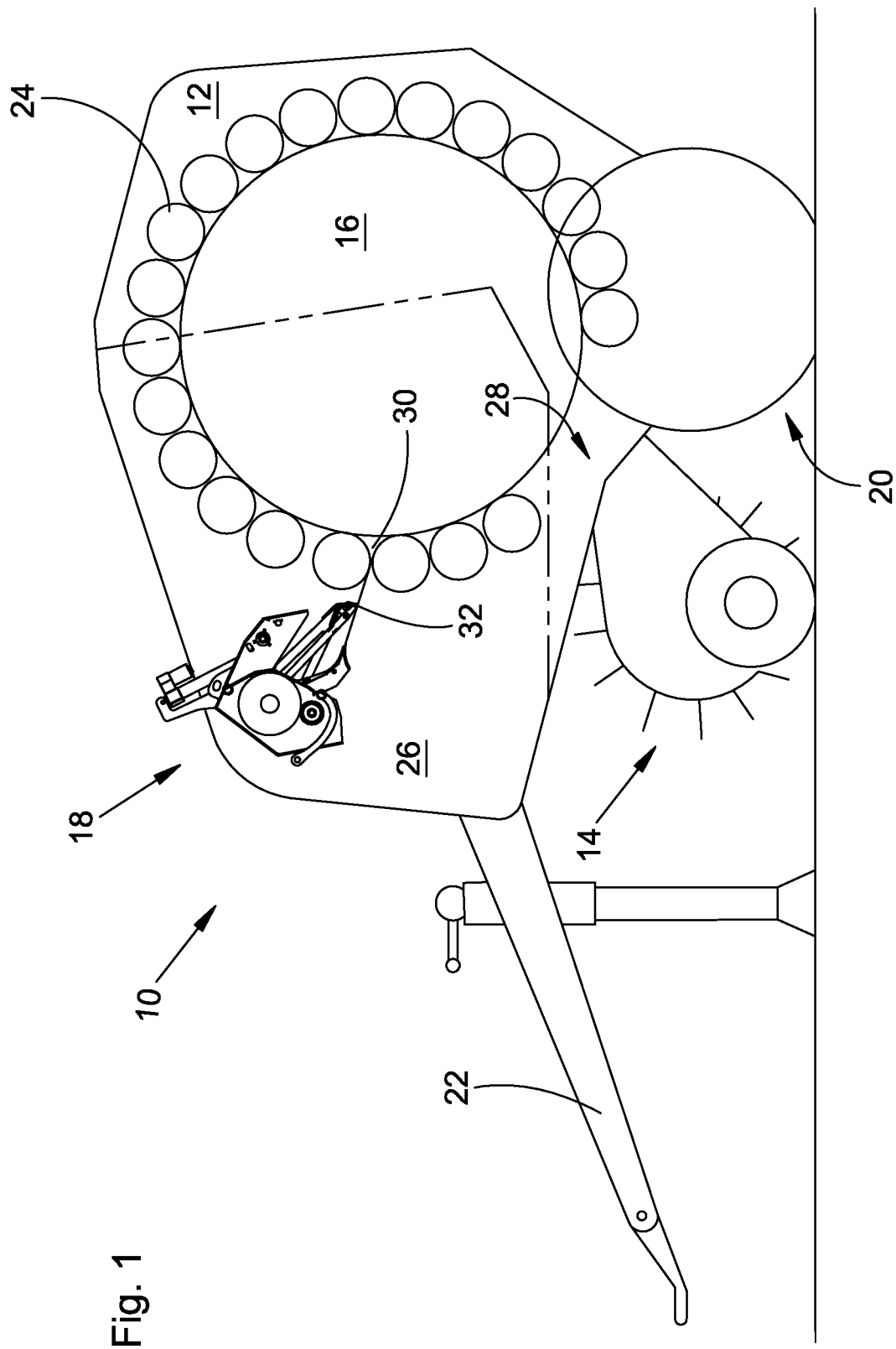
FIG. 1 is schematic side view depiction of a round baler with a web wrap device according to the invention.

With reference now to the drawings it can be seen that FIG. 1 shows a round baler 10, which has a chassis 12, a pick-up 14, a bale chamber 16, a web wrap device 18, an axle with wheels 20, a tongue 22 and pressing means 24.

The round baler 10 is of an ordinary fixed chamber design, but could, alternatively, be a variable chamber baler.

The chassis 12 rests on the axle with wheels 20, carries the pick-up 14 and can be connected to a tractor or the like by means of the tongue 22. The chassis 12 has substantially one or multiple part side walls 26, which are spaced apart from each other to receive between them the bale chamber 16, the web wrap device 18 and the pressing means 24.

The pick-up 14 picks up crop from the ground and delivers it to the bale chamber 16 through a crop inlet 28 between pressing means 24.

The bale chamber 16 is covered substantially by the pressing means 24 on the circumference and by the side walls 26 on the face side. Besides the crop inlet 28 a gap 30 is provided between the pressing means 24, through which web 32 may be fed into the bale chamber 16. The bale chamber 16 serves to form a cylindrical bale of hay, straw or the like, which will be covered by the web 32 of plastic, net, paper or similar material. The pressing means 24 in this embodiment are in the form of steel rolls rotatably received in the sidewalls 26 and extending perpendicular to them. These pressing means 24 are arranged on a circle.

Figure 2:
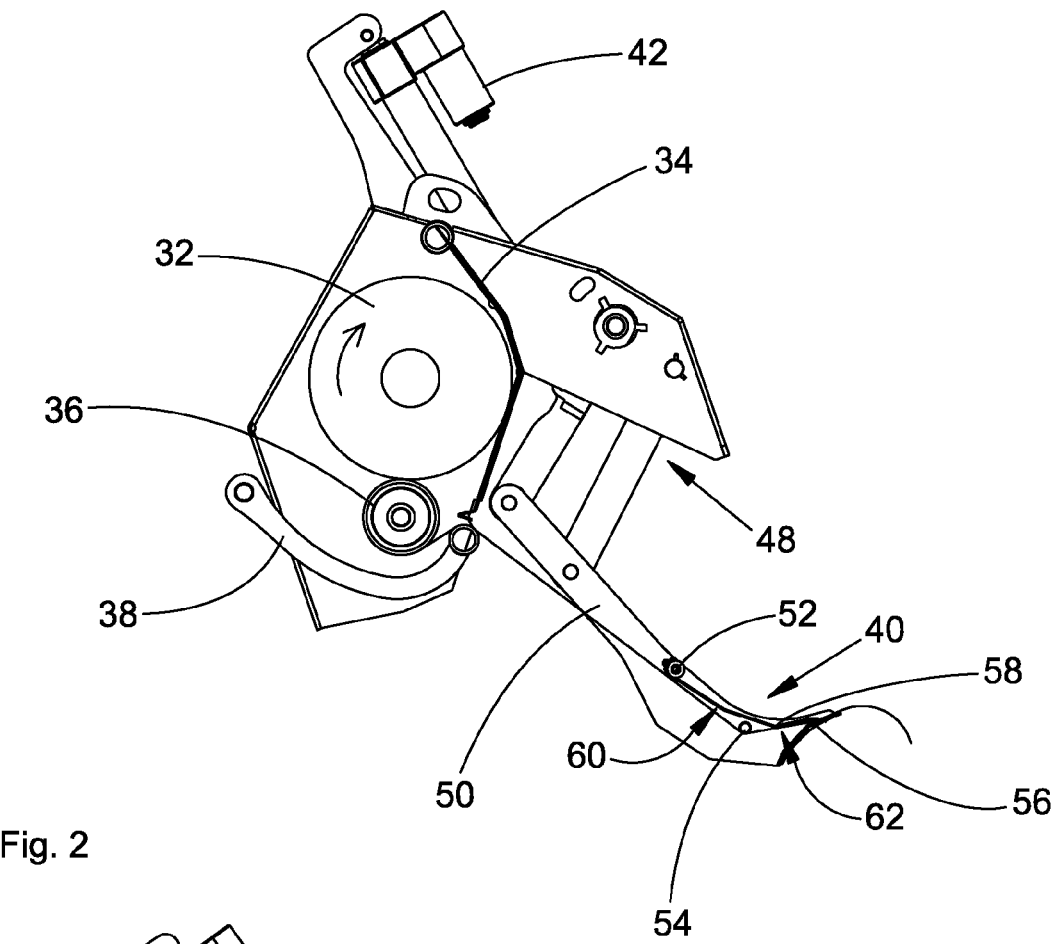
FIG. 2 is a more detailed side view of the web wrap device in a position between a rest position and a delivery position.
Figure 6:
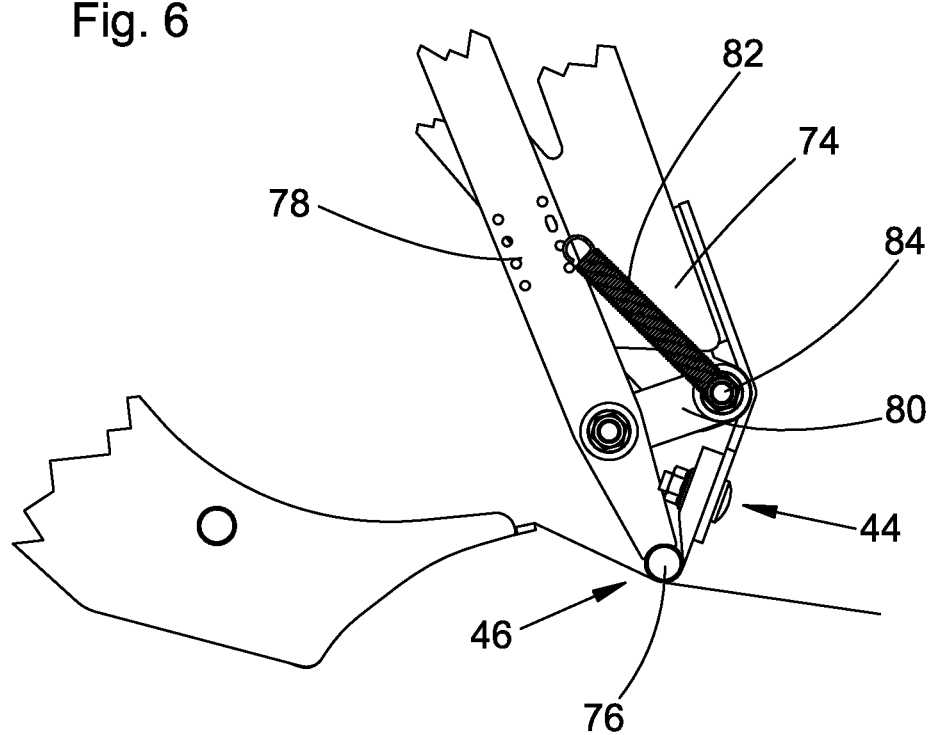
FIG. 6 is a side view of a guard for a knife in a guarding position.
Figure 7:
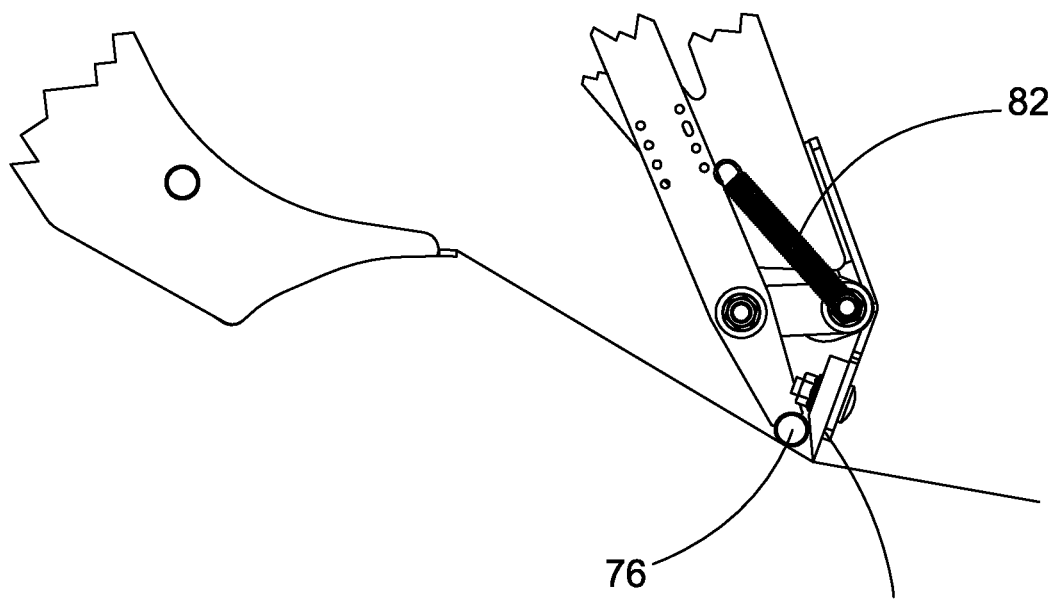
FIG. 7 is the guard of FIG. 6 in a non-guarding position.

The web wrap device 18 is visible in more detail in FIG. 2 and contains among other things a housing 34, a drive roll 36, a tensioning mechanism 38, a web carrier 40, an actuator 42 and—as shown in FIGS. 6 and 7 a knife 44 and a guard 46. Except the web carrier 40 and the guard 46 the web wrap device 18 could be of any other known type.

The housing 34 consists of sheet metal and holds a roll of web 32.

The drive roll 36 extends horizontally between the sidewalls 26 and carries the roll of web 32 alongside. The drive roll 36 is surrounded by the web on a portion of its circumference and is preferably covered with rubber to transport the web 32. In order to feed the web 32 from the roll to the bale chamber 16 the drive roll 36 is rotated by a motor or another driven component of the round baler 10, once the bale reached the desired diameter.

The tensioning mechanism 38 is located such, that it acts onto the span of the web 32 between the drive roll 36 and the web carrier 40. The tensioning mechanism 38 provides for a good gripping effect due to a high degree of circumferential coverage of the rubber coated drive roll 36 on the web 32, which will cause considerable tension in the web 32 when the bale rotating in the bale chamber 16 starts pulling the net faster than the drive roll 36 will release.

Figure 3:
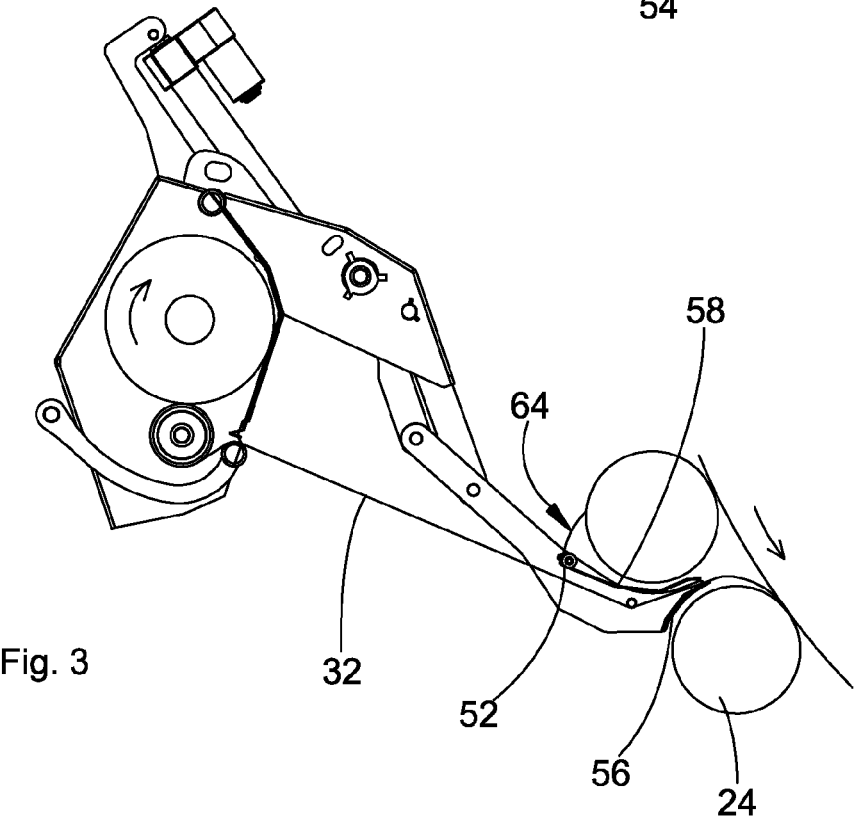
FIG. 3 is the web wrap device according to FIG. 2 in the delivery position.
Figure 5:
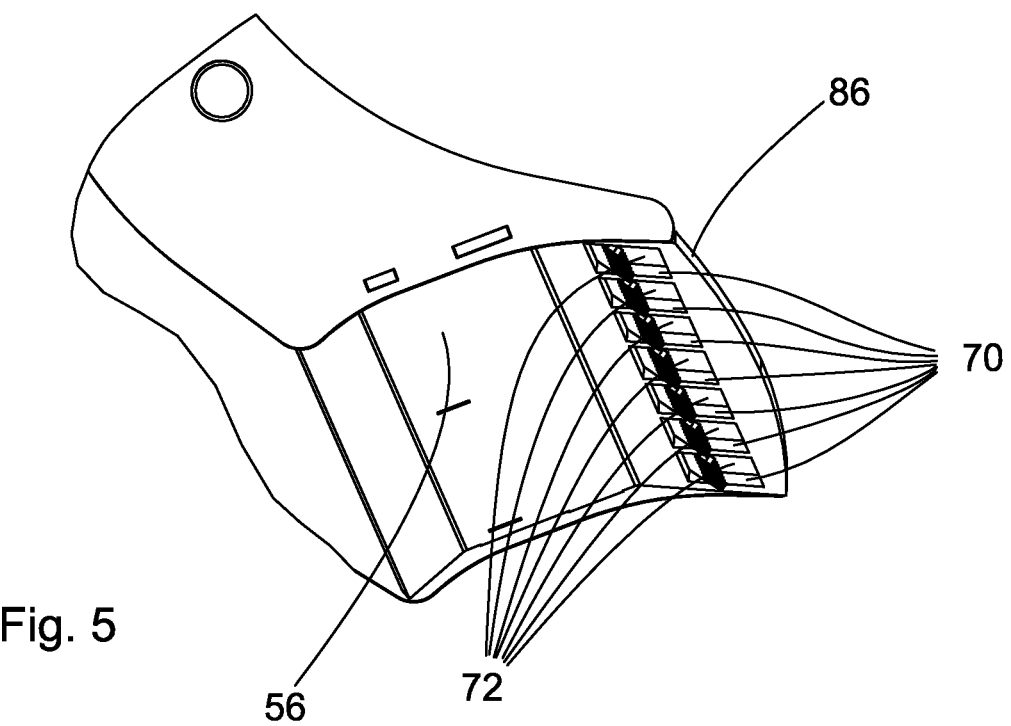
FIG. 5 is a perspective view of the delivery end of the web carrier in a closed condition with fingers protruding through apertures.

The web carrier 40 is moveable between a rest position as shown in FIG. 1 and a delivery position as shown in FIG. 3, in order to start and complete a wrapping cycle. For moving between these positions and transporting the web 32, the web carrier 40 has a parallelogram linkage 48 at both ends of the housing 34 acted upon by the actuator 42. The parallelogram linkage 48 provides for a movement in a vertical plane between the sidewalls 26 towards and away from the circumference of the bale chamber 16. While one side of the parallelogram linkage 48 is pivotally connected to the chassis 12, the other side is pivotably connected to an arm 50 on each side of the bale chamber 16. Connections happen along four parallel but radially imaginary distant axes. These arms 50 are rigidly interconnected by a bearing 52, a deflector 54, and a rigid element 56 to form a stiff, but moveable assembly. The end portion of each arm 50 connected to the parallelogram linkage 48 extends quite straight, whereas the other end portion terminates in a slight curve like a "J" towards the bale chamber 16. The bearing 52 as well as the deflector 54 are both formed as cylindrical bars, which are either welded or bolted to the arms 50 and which have a radial distance to each other of about 10 cm. In another embodiment, the element 56 may not be rigidly connected to the arms 50, but to some extent flexibly, provided. However, the moveable element 58 is still able to clamp the web 32 with its front portion. As can be seen in FIGS. 2 and 3, the stationary element 56 follows part of a circle, which helps in moving the end portion of the web carrier 40 closer to the pressing means 24 and through the gap 30. As can be seen in FIG. 5, the stationary element 56 is not only curved in the vertical direction, but a leading edge 86 of it is also bent in the horizontal direction, i.e. along the center axis of the bale. The curved shape is convex, i.e. the center part of the leading edge 86 of the stationary element 56 is closer to the bale chamber 16 than the outer areas. This shape will stretch the web 32 across its width, such that the web 32 reaches to the face sides of the bale and where need be, even over the corner of the bale.

In the curved end portion of the arms 50 a moveable element 58 is provided, which can pivot about the bearing 52 to and away from the bale chamber 16.and which due to its weight moves towards the fixed element 56. If web 32 is inserted into the web carrier 40 it will be located between the moveable and the stationary element 56 and 58. The moveable element 58 is made of sheet metal and follows the shape of a "J", i.e. it also follows the shape of the arms 50, but it is smaller. The moveable element 58 is formed and arranged such, that the deflector 54 as well as the web 32 will face its bottom side. An upper and longer portion 60 of the moveable element 58 extends almost rectangular to the stationary element 56, whereas the lower portion 62 runs to it under an angle of about 45 degrees, when they rest on each other. This angle is not fixed, but may be more or less steep, provided the leading edge of the moveable element 58 or the bottom side immediately behind the front edge is able to press the web 32 onto the stationary member 56 along a more or less sharp line.

Reference is made to FIG. 3 showing the moveable element 58, the web 32 and the stationary element 56 as a stack positioned between two adjacent pressing means 24 such, that a piece of web 32 hanging down from the leading edge 86 of stationary element 56 can reach the bale chamber 16. FIG. 3 shows a further improvement of the moveable element 58, namely a kick-off means 64 in the form of a lever rigidly connected to the moveable element 58 close to the bearing 52. The kick-off means 64 is formed and arranged such, that it will hit an adjacent pressing means 24, when the web carrier 40 is in the position shown in FIG. 3, in which the web 32 shall be released to the bale chamber 16, thereby lifting the moveable element 58 off the web 32 and the stationary element 56 to assure that the web 32 is free to move. As can be seen in the drawing, the moveable element 58 can be pivoted upwardly to such an extent, that it is possible to reach through a gap between them in order to enter new web 32, such that it hangs down the leading edge 86; and such a wide gap also allows obstacles, like stone, or accumulated crop to move through rather than blocking this passage.

Figure 4:
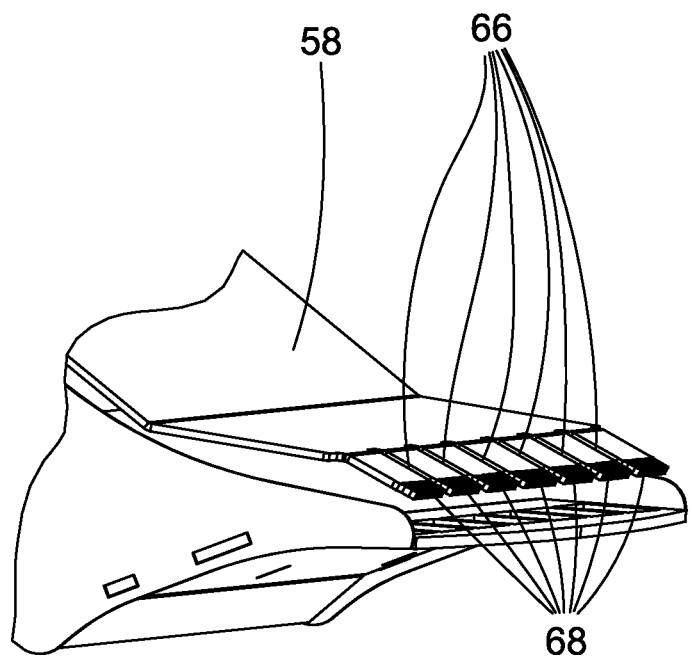
FIG. 4 is a perspective view of the delivery end of the web carrier in an open condition.

FIGS. 4 and 5 show in detail the front area of the stationary element 56 and of the moveable element 58. As can be seen the front area of the moveable element 58 has several slots 66 extending along the direction of web movement to form seven fingers 68. Depending on the number and shape of slots 66 the fingers 68 are wider or smaller, which can reach from two pieces in total to a row of fine teeth. While according to the drawing the fingers 68 are bent downwardly with respect to the remainder of the moveable element 58, they could as well extend in the same plane. The downward inclination assists in clamping the web 32. As can be seen in FIG. 5, a corresponding set of ribs 70 and apertures 72 is provided, through which the comb like front edge of the moveable element 58 may protrude. Web 32 being located between these two elements 56, 58 will surely be clamped and hold, when pulled from the roll of web 32 toward the bale chamber 16. Instead of the apertures recesses, depressions or the like may be provided, into which the fingers 68 may enter.

The following is a description of the knife 44 and especially of the guard 46, associated to the knife 44. The knife 44 is releasably attached to a rigid frame 74, which directly or indirectly is connected to the side walls 26. The knife 44 is stationary and performs a separating action only, when the web 32 is brought into contact with it; no counterknife is provided. The knife 44 has a leading edge, which either is straight and sharp or which is toothed. In order to avoid unintended separation of the web 32 and/or ongoing sliding movement of the web 32 over the edge of the knife, which may decrease its sharpness, the guard 46 is provided. The guard 46 consists of a deflector bar 76 and on both sides of an actuator 78, lead by a lever 80 and pulled into the guard position by a spring 82.

The deflector bar 76 extends over the full length of the knife 44, i.e. over the full width of the web 32 and is rigidly connected to the actuators 78 with its ends to form a solid U-shaped frame. The actuators 78—one on each side—are carried by one end area of the levers 80, which on the opposite end area are journaled on a bearing 84 on the frame 74. Both connections allow a vertical swing movement of the actuators 78 about the bearing 84 of the levers 80 on the frame 74. The spring 82 is formed as a tension coil spring, which is fixed at one end to the bearing 84 and at its opposite end to the actuator 78, thereby drawing the actuator 78 and with it the deflector bar 76 into the guard position covering the edge of the knife 44. Upward movement of the actuators 78 and of the deflector bar 76 happens depending on the position of the web carrier 40, as can be seen in FIGS. 6 to 7. The up and down movement is caused/allowed by either a motor (not shown), like an electric motor, or by a linkage, like a cam and follower, activated by the movement of the parallelogram linkage 48. As can be seen from FIG. 6 the deflector bar 76 finds itself between the track of the web 32, when it is tensioned from the end of the web carrier 40 to the gap 30 between the pressing means 24 during the wrapping mode. This will avoid a contact of the web 32 with the knife 44. The situation shown in FIG. 7 is the cutting mode, which follows, once a bale is wrapped completely. In this cutting mode the actuators 78 are released such, that the spring 82 may pull the deflector bar 76 away from the knife 44, such that the edge of the knife 44 is exposed to the web 32 and will separate it, when contact happens. It can be seen from FIG. 7, that the end of the web carrier 40 has a considerable distance to the knife 44, when the web 32 is cut, which will result in a portion of the web 32 hanging down from the stationary element 56 and is ready to be gripped by a rotating bale, once the web carrier 40 is moved through the gap 30 between two pressing means 24.

Subsequent to this detailed description the function of the web wrap device 18 is explained, starting from the depiction in FIG. 1.

FIG. 1 shows the web carrier 40 in its resting position, in which it is as far away from the gap 30 as possible. In this position the web 32 is clamped by the moveable element 58, and especially by its fingers 68, onto the stationary element 56, and there especially into the apertures 72. It is evident, that the portion of the web 32 extending beyond the leading edge of the moveable element 58 acts onto the front edge and tends to pivot the moveable element 58 in a clockwise direction about the bearing 52 (see FIGS. 1-3), which will press the moveable element 58 more onto the stationary element 56, thereby increasing the clamping force. In order to feed the web 32 into the bale chamber 16 for getting engaged with a rotating bale, the web carrier 40 is moved from the rest position in FIG. 1 to the feeding position in FIG. 3, thereby pulling web 32 from the roll in the housing 34 via the drive and brake roll 36 and the tensioning mechanism 38. During this movement controlled by the parallelogram linkage 48 the web 32 is under tension and on its shortest way between the clamping area between the elements 56, 58 and the tensioning mechanism 38 the web 32 will contact the deflector 54 rather than the bottom side of the moveable element 58, which thus rests in place and holds the web 32 firm. Once the portion of the web 32 hanging down the stationary element 58 is gripped by the rotating bale, the web 32 will be pulled into the bale chamber 16 thereby pushing the moveable element 58 slightly upwardly. If the kick-off means 64 shown in FIG. 3 is provided, this upward movement will be assisted by the cantilever action. Once the wrapping action is completed, the web carrier 40 is moved away from the gap 30 behind the knife 44. When the edge of the stationary element 56 is sufficiently far away from the knife 44, the guard 46 is moved away from the knife 44 and allows the cutting action.

Having described the preferred embodiment, it will become apparent that various modifications can be made without departing from the scope of the invention as defined in the accompanying claims.

The invention claimed is:

1. A web wrap device having a web carrier movable between a rest position and a web delivery position, the web carrier having two elements between which the web is pinched when moving towards the delivery position, at least one of the elements being moveable with respect to the other and wherein the moveable element is arranged such, that when the web is pulled by the web carrier, the web by itself acts on the moveable element to move the moveable element against the other element to increase a clamping force on the web.

2. A web wrap device according to claim 1, wherein a leading edge of the moveable element is at least one of: perforated, toothed, profiled complementarily to a profile of the other element and has fingers.

3. A web wrap device according to claim 1, wherein an area of contact of the web on the movable element is at least one of: perforated, toothed, curled, roughened, profiled complementarily to a profile of the other element and is provided with a high resistance surface.

4. A web wrap device according to claim 1, wherein apertures are provided in the other element opposite to one of protrusions, fingers or teeth on the moveable element.

5. A web wrap device according to claim 1, wherein the moveable element is pivotable about a bearing spaced apart from the other element by at least 5 cm.

6. A web wrap device according to claim 5, wherein a deflector for the web is provided between a bearing and a leading edge of the moveable element.

7. A web wrap device according to claim 6, wherein at least one of the other element, the bearing or the deflector is rigidly connected to two arms, being operated by an actuator.

8. A web wrap device according to claim 1, wherein the moveable element is curved with a leading portion being less inclined with respect to the other element, than a trailing portion.

9. A web wrap device according to claim 1, wherein a leading edge of one element is curved convexly and in the extension of its movement.

10. A web wrap device according to claim 1, wherein a kick-off means is attached to the moveable element, to move the moveable element out of contact with the other element, when it hits an object.

11. A web wrap device according to claim 1, wherein the moveable element is brought into contact with the other element by one of spring force or by gravity.

12. A web wrap device according to claim 1, having a knife to separate the web, and a guard that is moveable between the web and the knife.

13. A web wrap device according to claim 12, wherein the guard is moveable depending on one of the tension in the web or the position of the web carrier.

14. A web wrap device according to claim 12, wherein the guard is applied by one of the force of a spring or by gravity, and has a low friction surface.

* * * * *